United States Patent [19]
Suzuki et al.

[11] Patent Number: 5,128,775
[45] Date of Patent: Jul. 7, 1992

[54] METHOD FOR PLAYING ANALOG AND DIGITAL VIDEO SIGNALS IN A PREDETERMINED ORDER FROM A COMPOSITE DISK

[75] Inventors: Tsutomu Suzuki; Takashi Kato, both of Saitama, Japan

[73] Assignee: Pioneer Electronic Corporation, Tokyo, Japan

[21] Appl. No.: 634,669

[22] Filed: Dec. 27, 1990

[30] Foreign Application Priority Data

Apr. 4, 1990 [JP] Japan .................................. 2-89885

[51] Int. Cl.⁵ .............................................. H04N 5/76
[52] U.S. Cl. .................................... 358/343; 358/342
[58] Field of Search .............. 358/343, 342, 335, 310

[56] References Cited

U.S. PATENT DOCUMENTS

| | | |
|---|---|---|
| 4,698,695 | 10/1987 | Kosaka et al. ........................ 358/343 |
| 4,768,104 | 8/1988 | Kanamaru ............................. 358/343 |
| 4,839,746 | 6/1989 | Kanamaru ............................. 358/342 |
| 4,994,925 | 2/1991 | Yamashita et al. ................... 358/343 |
| 5,010,417 | 4/1991 | Yoshio et al. ........................ 358/342 |

Primary Examiner—Donald McElheny, Jr.
Assistant Examiner—Khoi Truong
Attorney, Agent, or Firm—Sughrue, Mion, Zinn, Macpeak & Seas

[57] ABSTRACT

A composite disk playing method according to which, at the time of playing a disk, identifier data are read out, a signal is read out from a multiplex recording area to reproduce and output a predetermined one of an analog video signal and a digital video signal when it is determined in accordance with the identifier data that the type of the disk to be played is a composite disk on which the analog video signal and the digital video signal have been recorded, and subsequently a signal is read out from the multiplex recording area to thereby reproduce and output the other signal. In playing a composite disk, therefore, longer disk playing becomes possible automatically.

9 Claims, 7 Drawing Sheets

METHOD FOR PLAYING ANALOG AND DIGITAL VIDEO SIGNALS IN A PREDETERMINED ORDER FROM A COMPOSITE DISK

BACKGROUND OF THE INVENTION

1. Field of the Invention

The present invention relates to a method of playing a composite disk, such as a video disk, on which an analog video signal and a digital video signal have been recorded.

2. Description of the Related Art

On ordinary video disks audio FM signals and video FM signals are recorded in frequency-multiplexed manner, the video FM signals in a band of approximately 4 to 14 MHz. The audio FM signals are recorded separately in two channels in narrow bands around 2.3 MHz and 2.8 MHz. In some cases, an EFM (Eight to Fourteen Modulation) signal carrying a digital signal having two-channel audio signals subjected to PCM (Pulse Code Modulation) is recorded in a band equal to or below approximately 2 MHz.

With conventional video disks in use, however, the maximum play time allowed is normally 60 minutes each side, making it impossible to ensure longer play time for moving pictures.

SUMMARY OF THE INVENTION

It is therefore an object of the present invention to provide a composite disk playing method which can ensure longer play time.

To achieve this object, according to one aspect of the present invention, there is provided a method of playing a composite disk having a multiplex recording area in which an FM signal carrying an analog video signal and an EFM signal carrying a digital video signal are recorded in frequency-multiplexed manner and having identifier data indicating a disk type recorded in a predetermined area, the method comprising the steps of reading the identifier data at a time of playing the disk, reading a signal from the multiplex recording area to reproduce and output a predetermined one of the analog video signal and the digital video signal when it is determined in accordance with the identifier data that the type of a disk to be played is a composite disk, and reading a signal from the multiplex recording area after outputting the one signal to thereby reproduce and output the other signal.

According to another aspect of the present invention, there is provided a method of playing a composite disk having a multiplex recording area in which an FM signal carrying an analog video signal and an EFM signal carrying a digital video signal are recorded in frequency-multiplexed manner and having a control signal indicating a priority of reproduction between the analog video signal and the digital video signal recorded in a predetermined area, the method comprising the steps of reading the control signal from the predetermined area at a time of playing the composite disk, reading a signal from the multiplex recording area after reading the control signal, reproducing and outputting one of the analog video signal and the digital video signal in accordance with the priority indicated by the read control signal, and reading a signal from the multiplex recording area after the signal output to thereby reproduce and output the other signal.

According to a further aspect of the present invention, there is provided a method of playing a composite disk having a multiplex recording area in which an FM signal carrying an analog video signal and an EFM signal carrying a digital video signal are recorded in frequency-multiplexed manner and having a control signal indicating a priority of reproduction between the analog video signal and the digital video signal and a read position recorded in the multiplex recording area, the method comprising the steps of reading a signal from a read position specified by the control signal upon reading the control signal while playing the composite disk, and reproducing and outputting one of the analog video signal and the digital video signal in accordance with the priority indicated by the read control signal.

DETAILED DESCRIPTION OF THE PREFERRED EMBODIMENTS

One preferred embodiment of the present invention will now be described referring to the accompanying drawings.

Figure 1:
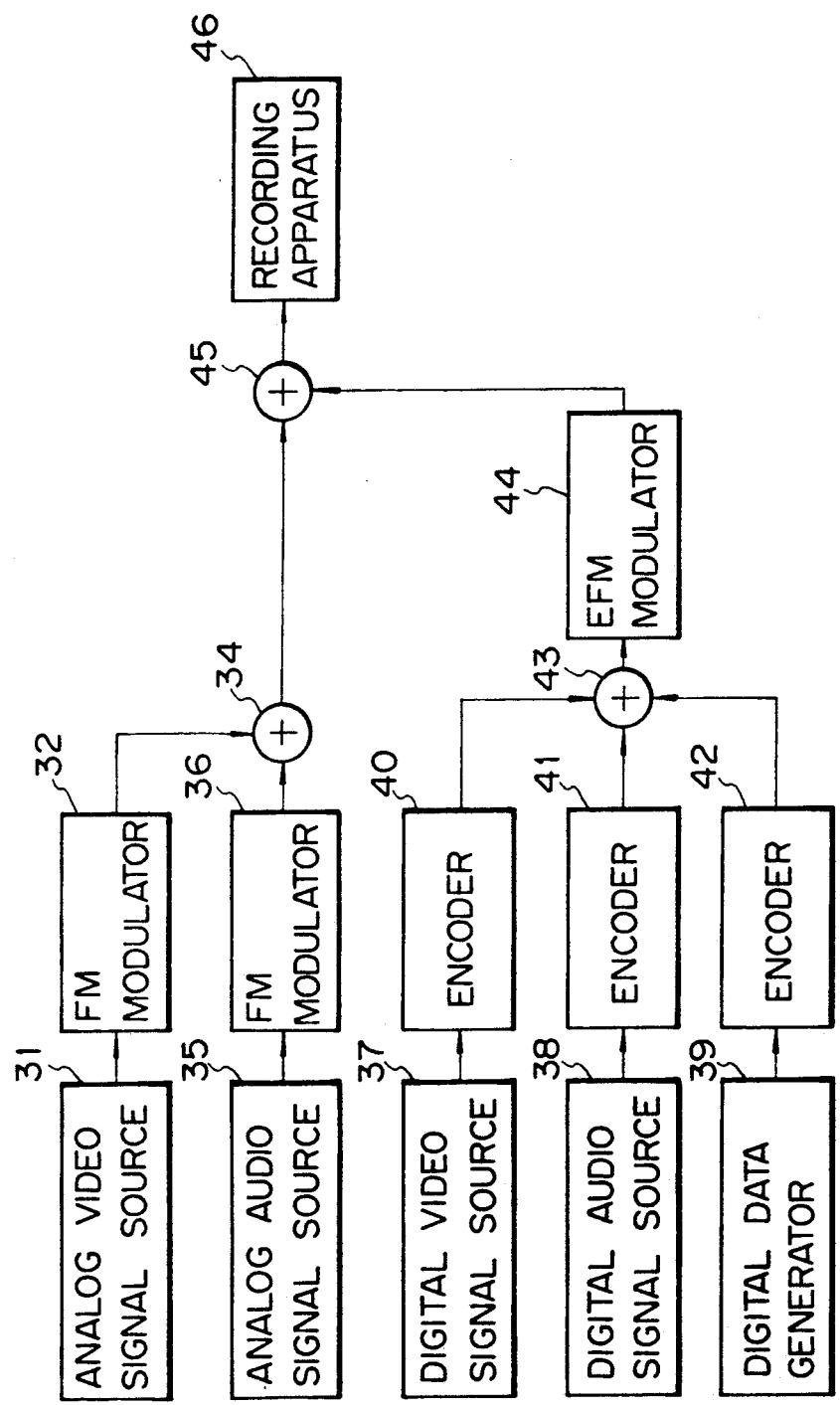
FIG. 1 is a block diagram illustrating a recording apparatus for preparing a composite disk.

FIG. 1 illustrates a recording apparatus for providing a composite disk for use in the playing method of the present invention. In this recording apparatus, a video signal source 31, such as a video tape recorder, is designed to output an analog video signal in synchronism with a sync signal from, for example, a sync signal generator (not shown).

The video signal from the video signal source 31 is supplied to an FM modulator 32 which modulates the frequency of a carrier signal having a first predetermined frequency to produce a video FM signal. This video FM signal is sent to an adder 34.

An audio signal source 35, such as an audio tape recorder, outputs a two-channel analog audio signal. This audio signal from the source 35 is sent to an FM modulator 36 which modulates the frequency of a carrier signal having a second predetermined frequency to produce an audio FM signal. This audio FM signal is supplied to the adder 34 where it is added to the video FM signal.

A digital video signal source 37, on the other hand, generates a digital video signal acquired by A/D conversion of an analog video signal. A digital audio signal source 38 generates a two-channel digital audio signal. A digital data generator 39, such as a microcomputer, outputs a digital data signal, such as TOC (Table of Contents) data (information) including disk identifier data, other than a digital audio signal. The digital video signal is encoded in predetermined format and compressed to a DVI (Digital Video Interactive) signal by an encoder 40. As the DVI signal is well known, its detailed description will be omitted. It is desirable, though not essential, that the digital video signal be converted into a compressed signal as mentioned above; however at least the video signal should be digitized. The digital audio signal is encoded in predetermined format and compressed by an encoder 41. The digital data signal is also encoded in predetermined format to be a subcode signal by an encoder 42. The output data of the encoders 40 to 42 are supplied to a multiplexer 43. The multiplexer 43 is designed to add the individual output data of the encoders 40 to 42 in response to a timing signal generated from a timing signal generator (not shown). The output signal of the multiplexer 43 is sent to an EFM modulator 44 where it is converted into an EFM signal. The output signal of the EFM modulator 44 is supplied to an adder 45 where it is added to the output signal of the adder 34. The output signal of the adder 45 is supplied to a recording apparatus 46 which is a well-known optical video disk recorder, for example. In the recording apparatus 46, the output signal of the adder 45 is sent to an optical modulator and a recording track formed by pits is formed on the recording surface of a master disk that rotates at, for example, a frame cycle (1/30 sec). A stamper is prepared from the master disk, and then a plastic disk is produced from the stamper by a press work. A reflection film and a protective film are vapor-deposited on the plastic disk to thereby provide a video disk as a composite disk.

Figure 2:
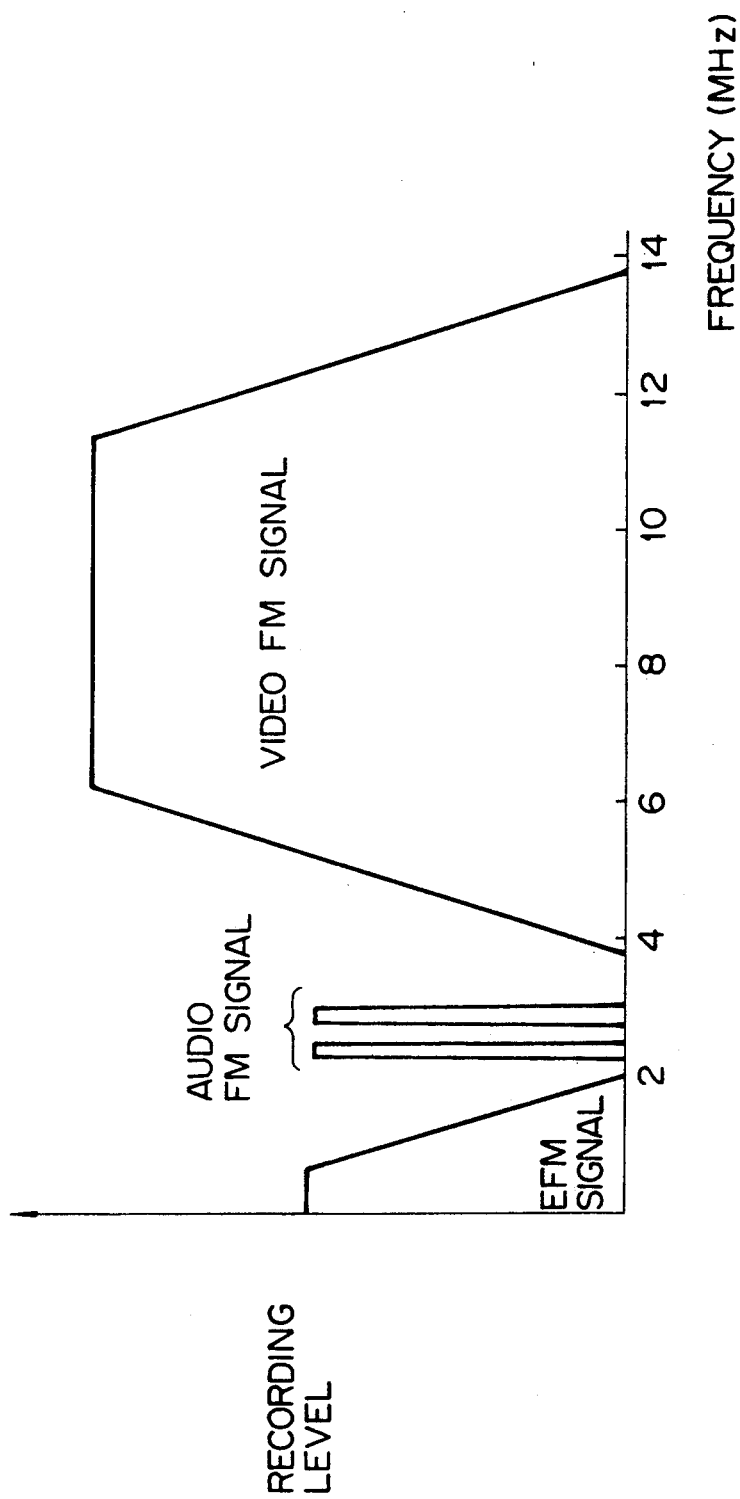
FIG. 2 is a diagram showing a recording frequency spectrum of a composite disk.

Through the above process, the composite disk would, as shown in FIG. 2, have a recording frequency spectrum such that the video FM signal is recorded in a band of approximately 4 MHz to 14 MHz while the audio FM signal is recorded in two channels in narrow bands around 2.3 MHz and 2.8 MHz, respectively. The EFM signal is recorded in a band equal to or less than 2 MHz. The TOC data is recorded in a read-in area of the composite disk; the identifier data indicating that the disk is a composite disk is also included in the TOC data.

The following will describe a video disk player which plays such a composite disk.

Figure 3:
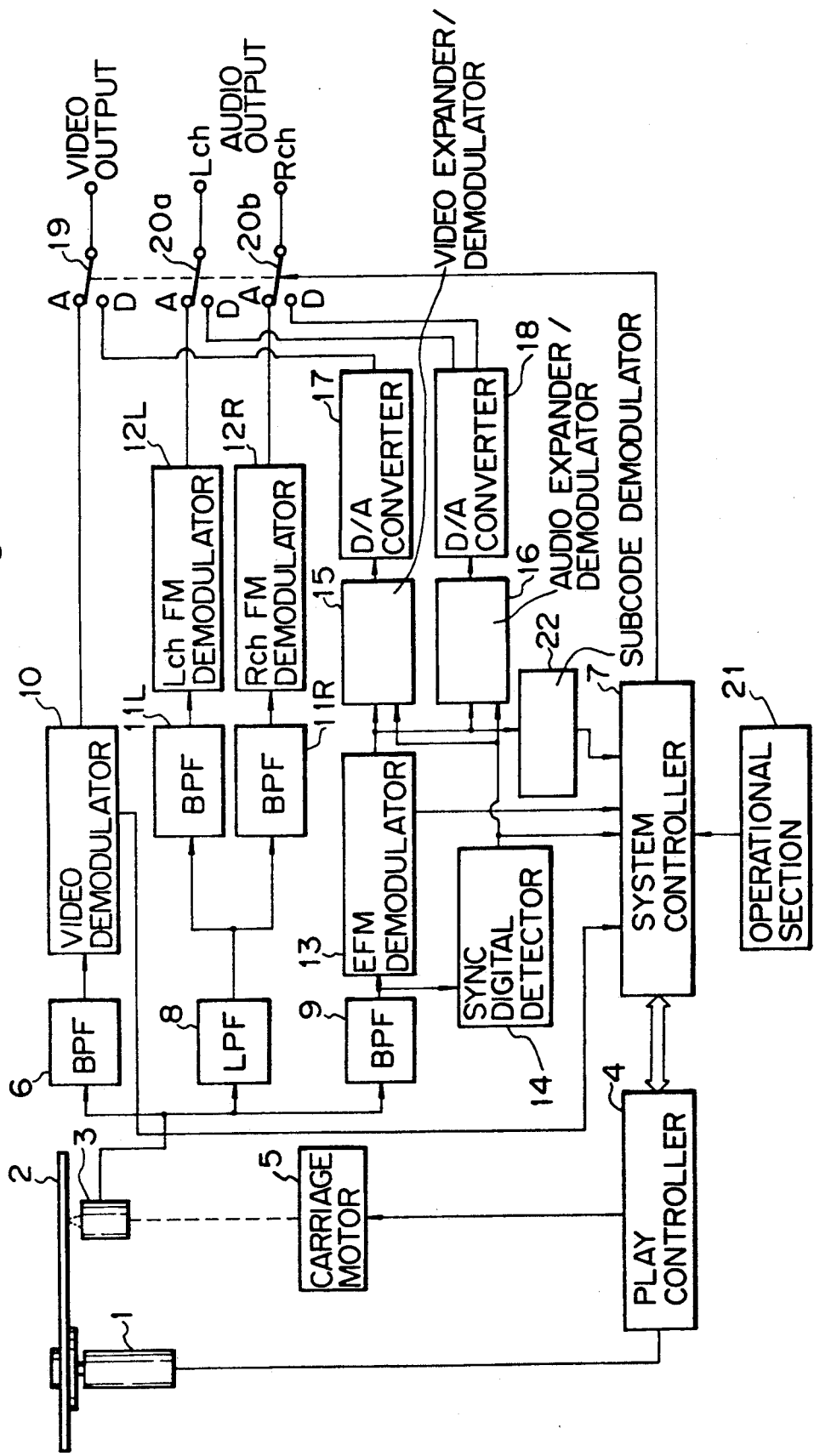
FIG. 3 is a block diagram of a video disk player to which the composite disk playing method of the present invention is applied.

In this player, a disk 2 is driven by a spindle motor 1 as shown in FIG. 3, and a signal recorded on the disk 2 is read out by an optical pickup in a carriage 3. The pickup is supported by the carriage 3 which moves in the radial direction of the disk 2 by a carriage motor 5, so that data read point (data reading optical spot) of the pickup can be freely positioned in the radial direction of the disk 2. The player further has various servo systems (not shown) including a spindle servo system, focus servo system, tracking servo system and carriage servo system.

The spindle motor 1 and carriage motor 5 are driven by the spindle servo system and carriage servo system, respectively or by a play controller 4. The play controller 4 is designed to drive the spindle motor 1 and carriage motor 5, and controls the ON/OFF operation of the various servo systems (not shown) in accordance with commands from a system controller 7.

An RF signal, which is the output signal read by the pickup, is supplied to a video FM band-bass filter (BPF) 6, a low-pass filter (LPF) 8 for analog FM signal, and a BPF 9 for digital EFM signal. A video FM signal passing the video FM BPF 6 is supplied to a video demodulator 10 where it is demodulated to a reproduction video signal. A signal passing the LPF 8 is separated into analog audio FM signals for left and right channels by BPFs 11L and 11R, which pass only audio carrier components of 2.3 MHz and 2.8 MHz. The individual analog audio FM signals are respectively demodulated to audio signals of left and right channels by FM demodulators 12L and 12R.

An EFM signal separated from a reproduction RF signal by the BPF 9 is supplied to an EFM demodulator 13 and a sync signal detector 14. The EFM demodulator 13 performs EFM demodulation on a pulse signal acquired by slicing the RF signal, to thereby prepare PCM compressed data and a subcode. The PCM compressed data from the EFM demodulator 13 is sent to a video expander/demodulator 15 and an audio expander/demodulator 16. A sync signal detected by the sync signal detector 14 is supplied to the expander/demodulators 15 and 16 as a timing signal as well as to the system controller 7. The video expander/demodulator 15 expands the PCM compressed data or DVI data with a predetermined expanding coefficient and demodulates them to provide a digital video signal. The output of the video expander/demodulator 15 is sent to a D/A (Digital-to-Analog) converter 17 to be converted into an analog video signal. The audio expander/demodulator 16, on the other hand, expands the PCM compressed data with a predetermined expanding coefficient and demodulates them to provide a digital audio signal. The output data of the expander/demodulator 16 are supplied to a D/A converter 18. The D/A converter 18 has a demultiplexer for separating digital data including time-divisionally multiplexed audio data of left and right channels, channel by channel, and reproduces audio signals for both channels.

The subcode data including the TOC data, which is output from the EFM demodulator 13, is supplied through a subcode demodulator 22 to the controller 7.

The individual outputs of the video demodulator 10 and D/A converter 17 are selected by a select switch 19. The output audio signals for left and right channels from the FM demodulators 12L and 12R and the D/A converter 18 are selected by select switches 20a and 20b. The switches 19, 20a and 20b are interlocked and are controlled by the controller 7.

The subcode signal from the EFM demodulator 13 is sent to the system controller 7 which is constituted by a microcomputer comprising a processor, ROM, RAM and a timer. In response to a key-operated command sent from an operational section 21, the controller 7 performs an arithmetic operation based on data or a program stored in the ROM, RAM, etc., and then sends a command signal, such as play, search or jump, to the play controller 4.

The operation of the controller 7 at the time the disk is played will be discussed below, assuming the video disk has already been set at the play position.

Figure 4:
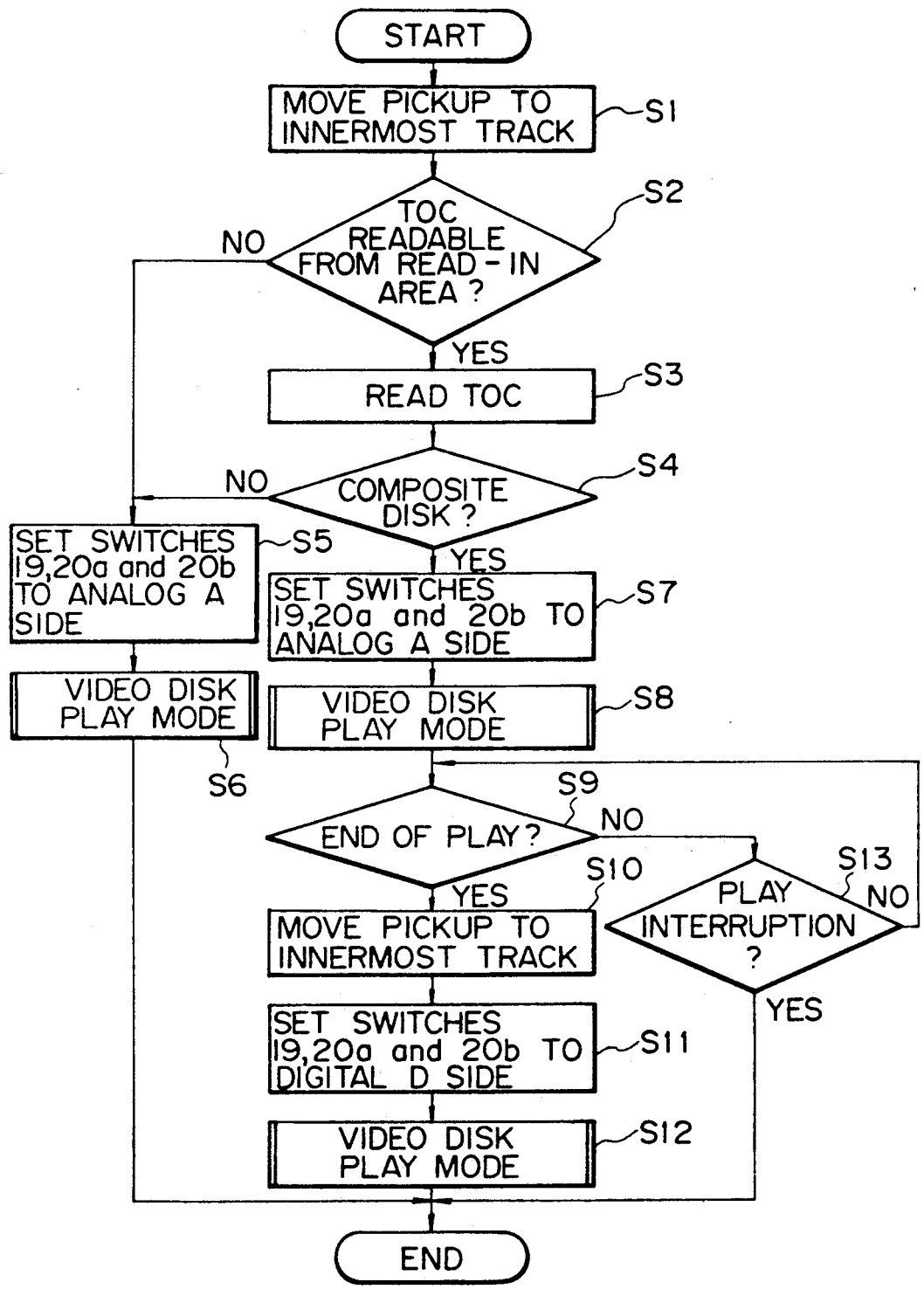
FIG. 4 is a flowchart illustrating the first embodiment of the present invention as the operation of a controller in the player shown in FIG. 3.

Upon reception of a play command from the operational section 21, the controller 7 first drives the carriage motor 5 through the play controller 4 to move the pickup to the innermost track on the disk (step S1), as shown in FIG. 4. When the pickup having reached the innermost track is detected by a detecting switch (not shown), focusing of the pickup is executed and then it is discriminated whether or not the TOC data can be read from the read-in area at the innermost track on the disk (step S2). If the TOC data can be read out, it is read out (step S3), and it is determined whether or not the disk is a composite disk on the basis of the TOC data (step S4).

If it is a composite disk, the TOC data recorded in the read-in area as described above should include identifier data that indicates such.

If the TOC data cannot be read out from the read-in area, it is determined that the disk in use is an ordinary video disk and the switches 19, 20a and 20b are set to the analog A side (step S5) to move the operation to a video disk play mode (step S6). As a result, the video signal from the video demodulator 10 is sent out through the switch 19, while the audio signals of the left and right channels from the demodulators 12L and 12R are sent out via the switches 20a and 20b, respectively. If the TOC data has been read out from the read-in area but the disk is not a composite disk, the operation is also moved to the video disk play mode. Since the play operation of this mode is well known, its detailed description will be omitted.

If the identifier data in the TOC data read out from the read-in area indicates that the disk is a composite disk, the switches 19, 20a and 20b are switched to the analog A side (step S7), the operation turns to the video disk play mode (step S8), and the disk starts playing. These operations are the same as done in steps S5 and S6. In other words, the video FM signal and audio FM signals shown in FIG. 2 are demodulated.

After step S8, it is determined whether or not the disk playing has been terminated (step S9). For instance, when the pickup has reached the read-out track at the outermost portion on the video disk or when no more video signals nor audio signals are output, it may be considered as the end of the disk play. When the disk play is completed, the pickup is moved to the innermost track on the disk (step S10). When the pickup reaches this position, the switches 19, 20a and 20b are switched to the digital D side (step S11), and the operation is shifted to the video disk play mode (step S12). Accordingly, the digital video signal demodulated by the video expander/demodulator 15 is output via the switch 19 after being converted into an analog video signal by the D/A converter 17, while the digital audio signal demodulated by the audio expander/demodulator 16 is converted into analog audio signals for left and right channels by the D/A converter 18 before being output via the switches 20a and 20b. In other words, the EFM signal portion in FIG. 2 is demodulated, and the video signal and audio signals are output.

If the disk play is not ended in step S9, it is then determined whether or not stopping the disk play has been instructed through a key operation at the operational section 21 (step S13). If the disk playing should continue, the operation returns to step S9, and if it should be stopped, this routine is terminated and the flow advances to a play stop routine (not shown).

Although the switches 19, 20a and 20b are automatically switched in this embodiment, the switching may be done by a key operation at the operational section 21. Further, in the above-described embodiment, only the multiplex recording area in which a signal obtained by frequency-multiplexing the FM signal carrying an analog video signal with the EFM signal carrying a DVI signal is recorded is considered as a video recording area on a composite disk. However, the composite disk in use may be designed in such a way that the multiplex recording area is just part of the video recording area and the area where the video FM signal and/or audio FM signals are recorded constitutes the other part. In this case, position data indicating the position of the multiplex recording area on the disk is included in the TOC data and the pickup is moved to the multiplex recording area on the basis of the position data in step S10.

A description will now be given regarding a method of playing a composite disk having a control signal recorded thereon which indicates the priority of reproducing an analog video signal or a digital video signal first, as another embodiment.

Figure 5:
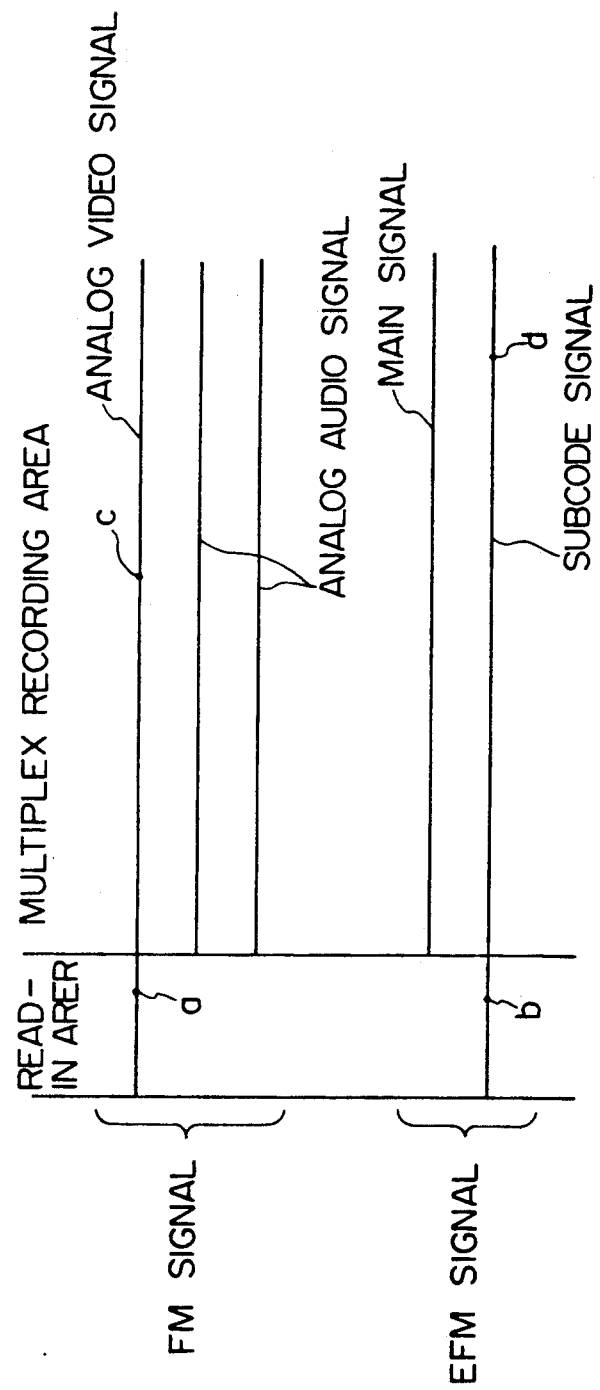
FIG. 5 is a diagram showing a recording position of a control signal on a composite disk.

FIG. 5 illustrates where a control signal indicating the reproduction priority is recorded on the innermost track on the composite disk in which an FM signal carrying an analog video signal and analog audio signal and an EFM signal carrying a digital video signal and digital audio signal have been recorded. On the FM signal side, a control signal "a" is written in a read-in area, that is a field between sync signals. A control signal is written as the aforementioned TOC data b in a read-in area on the EFM signal side. In a multiplex recording area on the FM signal side, a control signal c is included in the vertical blanking period of the video signal. In a multiplex recording area on the EFM signal side, a control signal d is included in a subcode signal with respect to a main signal including a digital video signal and digital audio signal. The control signal in the multiplex recording area includes data representing the read position of the pickup as well as data of the reproduction priority.

The present method for playing a composite disk on which the control signal has been recorded as described will be illustrated in relation to operations of the controller 7 from a second embodiment adapted to the video disk player shown in FIG. 3.

Figure 6:
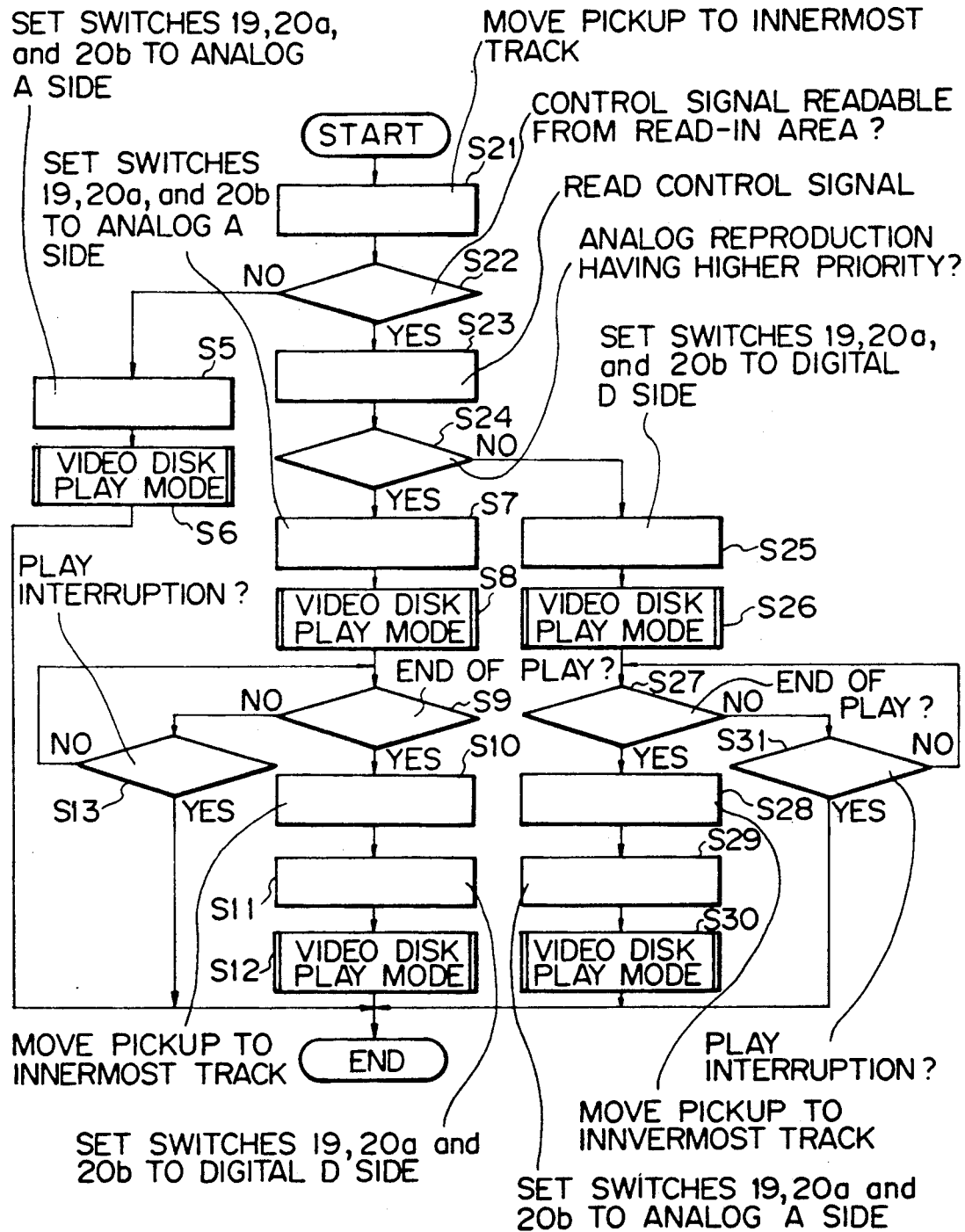
FIG. 6 is a flowchart illustrating the second embodiment of the present invention as the operation of the controller in the player shown in FIG. 3.

Upon reception of a play command from the operational section 21, the controller 7 first drives the carriage motor 5 through the play controller 4 to move the pickup to the innermost track on the disk (step S21), as shown in FIG. 6. When the pickup having reached the innermost track is detected by a detecting switch (not shown), focusing of the pickup is executed and then it is discriminated whether or not the control signal can be read from the read-in area at the innermost track on the disk (step S22). The control signal is separated from a video signal at the video demodulator 10, to be fed to the controller 7. The control signal may also be obtained from the TOC data. If the control signal can be read out, it is read out (step S23), and it is determined whether or not the reproduction priority specified by the control signal is an analog reproduction (step S24). If it is determined that the analog reproduction has a higher priority, steps S7 to S13 are executed as done in the flowchart shown in FIG. 4. Accordingly, the switches 19, 20a and 20b are switched to the analog A side first, setting the operation to a video disk play mode. As a result, the disk starts playing so that the video signal from the video demodulator 10 is sent out through the switch 19, while the audio signals of the left and right channels from the demodulators 12L and 12R are sent out via the switches 20a and 20b, respectively. When the pickup has reached the read-out track at the outermost track on the video disk, the switches 19, 20a and 20b are set to the digital D side, moving the operation again to the video disk play mode. Accordingly, the digital video signal demodulated by the video expander/demodulator 15 is output via the switch 19 after being converted into an analog video signal by the D/A converter 17, while the digital audio signal demodulated by the audio expander/demodulator 16 is converted into analog audio signals for left and right channels by the D/A converter 18 before being output via the switches 20a and 20b.

If it is determined in step S24 that the read-out control signal indicates digital reproduction having a higher priority, steps S25 to S31 will be performed. Accordingly, the switches 19, 20a and 20b are switched to the digital D side first, setting the operation to a video disk play mode. When the pickup has reached the read-out track at the outermost track on the video disk, the switches 19, 20a and 20b are set to the analog A side, moving the operation again to the video disk play mode.

Figure 7:
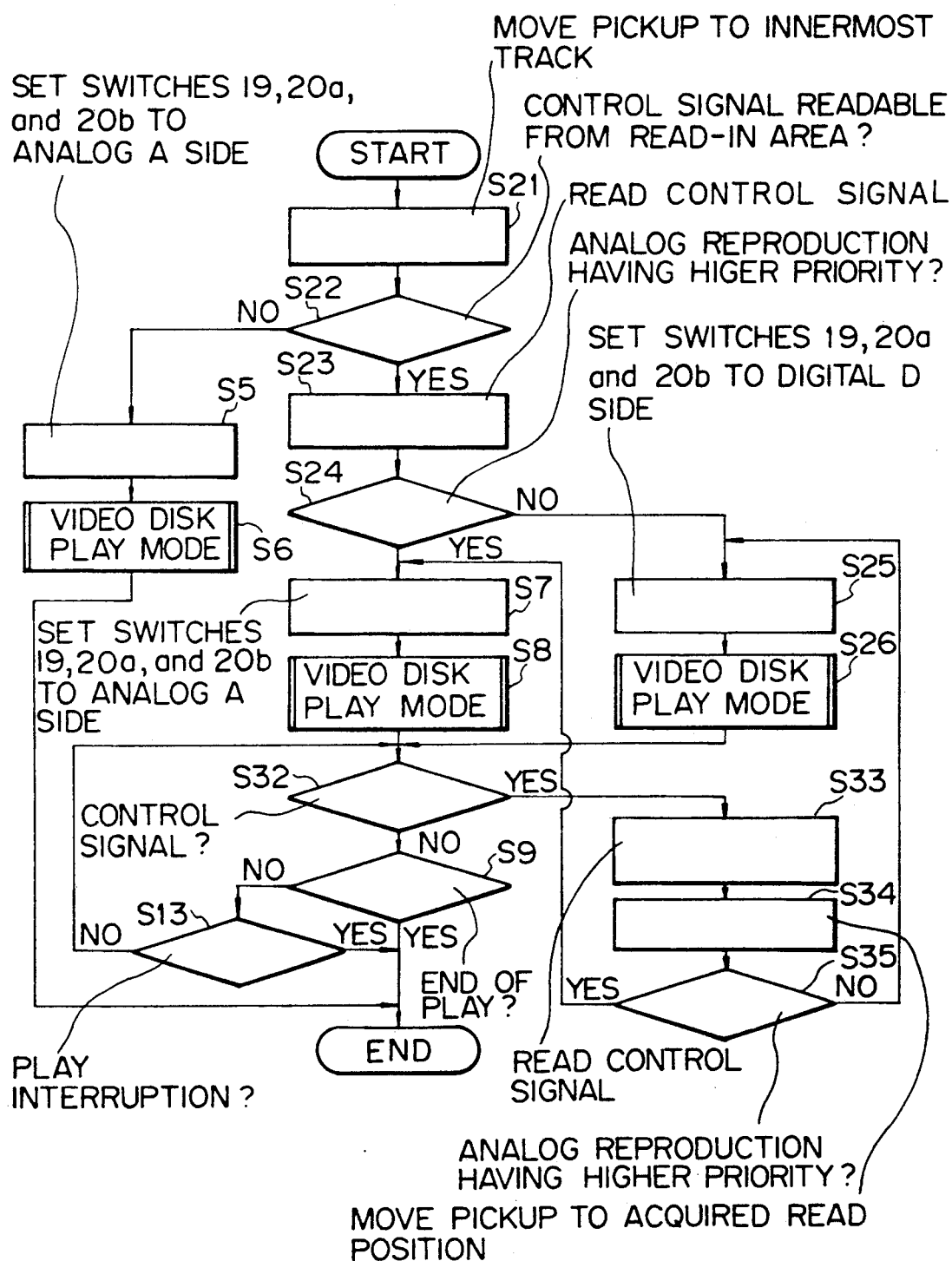
FIG. 7 is a flowchart illustrating the third embodiment of the present invention as the operation of the controller in the player shown in FIG. 3.

FIG. 7 illustrates the operation of the controller 7 in the third embodiment according to which the method of the present invention of playing a composite disk having controls signals recorded thereon as shown in FIG. 5 is applied to the video disk player shown in FIG. 3.

In the operation, the controller 7 executes step S7 and S8 when the reproduction priority specified by the control signal read out from the read-in area indicates analog reproduction having a higher priority, and executes steps S25 and S26 when digital reproduction has a higher priority. This part is the same as the one shown in FIG. 6. The controller 7 then determines whether or not a control signal is supplied during disk playing after execution of step S8 or S26 (step S32). If the control signal has been supplied, the controller 7 reads it out to acquire the reproduction priority and the read position of the pickup (step S33). Then, the controller 7 causes the play controller 4 to drive the carriage motor 5 to move the pickup to the detected read position (step S34) and determines whether or not the analog reproduction has a higher priority (step S35). The controller 7 executes steps S7 and S8 if the analog reproduction is preferential, and executes steps S25 and S26 when the digital reproduction has a higher priority.

Although each control signal simply specifies a single set of reproduction priority and read position of the pickup in the above embodiment, each control signal may indicate plural sets of the reproduction priorities and pickup read positions, so that one of the plural sets is selected in accordance with the playing conditions or operational command given at the time the control signal is read out, thus ensuring read position control and switching of reproduction outputs.

Although the control of the pickup read position and the switching between reproduction outputs are executed in accordance with the control signals recorded in the multiplex recording areas in the above embodiment, all the data about the control of the pickup read position and the reproduction switching may be stored in the read-in area so that the operation is carried out in accordance with these data.

Further, although the descriptions of the individual embodiments have been given with reference to the case of using a DVI signal as a digital video signal, the present invention is not restricted to this case, but may as well be applied to the case of using digital video signals of other system, such as CDI.

As described above, according to the present invention, at the time of playing a composite disk having a multiplex recording area in which an FM signal carrying an analog video signal and an EFM signal carrying a digital video signal are recorded in frequency-multiplexed manner and having identifier data indicating a disk type recorded in a predetermined area, the identifier data is read out, a signal is read out from the multiplex recording area to reproduce and output a predetermined one of the analog video signal and the digital video signal when it is determined on the basis of the identifier data that the type of the disk to be played is a composite disk, and then a signal is read out from the multiplex recording area to thereby reproduce and output the other signal. In the case where the video disk to be played is a composite disk which includes an analog video signal and a digital video signal, the analog video signal is reproduced first, the digital video signal being subsequently reproduced. This permits a user to operate a disk player without the need to distinguish the video disk from the composite disk, and automatically ensures long play time when playing the composite disk.

Further, according to the present invention, a composite disk has, recorded in a predetermined area, such as a read-in area, a control signal indicating the priority of reproduction between the analog video signal and the digital video signal, wherein at the time of playing this composite disk, the control signal is read out from the predetermined area, and subsequently a signal is read out from the multiplex recording area, so that one of the analog video signal and the digital video signal is reproduced in accordance with the priority indicated by the control signal, and thereafter a signal is read out from the multiplex recording area to thereby reproduce and output the other signal. It is therefore possible to reproduce the analog video signal and digital video signal recorded on the composite disk in accordance with the priority determined in advance on the soft supplier side and ensure long disk playing automatically.

Furthermore, according to the present invention, a composite disk has a multiplex recording area in which a control signal indicating the priority of reproduction between the analog video signal and the digital video signal and a read position is recorded, and when the control signal is read out while playing the composite disk, a signal is read out from the read position specified by the control signal read out and one of the analog video signal and the digital video signal is reproduced and output in accordance with the reproduction priority indicated by the control signal. It is therefore possible to reproduce the analog video signal and digital video signal recorded on the composite disk in accordance with the priority determined in advance on the soft supplier side, and to switch to the digital reproduction from the analog reproduction or vice versa at a middle portion of the disk. This can permit not only to automatically play the disk for a long period of time but also execute a special disk play.

What is claimed is:

1. A method of playing a composite disk having a multiplex recording area in which an FM signal carrying an analog video signal and an EFM signal carrying a digital video signal are recorded in frequency-multiplexed manner and having identifier data indicating a disk type recorded in a predetermined area, the method comprising the steps of:

reading said identifier data at a time of playing a disk;

determining whether or not the type of a disk to be played is said composite disk in accordance with the identifier data;

reading the frequency-multiplexed signal from said multiplex recording area to reproduce and output a predetermined one of said analog video signal and said digital video signal when said identifier data indicates that said disk to be played is said composite disk; and reading said frequency-multiplexed signal from said multiplex recording area after outputting said predetermined one of said analog video signal and said digital video signal to thereby reproduce and output the other of said analog video signal and said digital video signal.

2. A method according to claim 1, wherein said FM signal includes said analog video signal and an analog audio signal, said analog audio signal being reproduced and output together with said analog video signal, and said EFM signal includes said digital video signal and a digital audio signal, said digital audio signal being reproduced together with said digital video signal.

3. A method according to claim 1, wherein one of said reading steps further comprises the step of converting said digital video signal into an analog video signal.

4. A method according to claim 1, wherein said selected signal is said analog video signal and said another signal is said digital video signal.

5. A method of playing a composite disk having a multiplex recording area in which an FM signal carrying an analog video signal and an EFM signal carrying a digital video signal are recorded in frequency-multiplexed manner and having a control signal indicting a priority of reproduction between said analog video signal and said digital video signal recorded in a predetermined area, the method comprising the steps of:

reading said control signal from said predetermined area at a time of playing said composite disk;

reading the frequency-multiplexed signal from said multiplex recording area after reading said control signal;

reproducing and outputting a selected one of said analog video signal and said digital video signal in accordance with said priority indicated by the read control signal; and reading said frequency-multiplexed signal from said multiplex recording area after outputting said selected one of said analog and digital video signals to thereby reproduce and output the other of said analog and digital video signals.

6. A method according to claim 5, wherein said control signal is included as a subcode signal of said digital video signal.

7. A method of playing a composite disk having a multiplex recording area in which an FM signal carrying an analog video signal and an EFM signal carrying a digital video signal are recorded in frequency-multiplexed manner and having a control signal indicating a priority of reproduction between said analog video signal and said digital video signal and a read position recorded in said multiplex recording area, the method comprising the steps of:

determining whether or not said control signal is read out while playing said composite disk;

reading a signal from the read position specified by said control signal upon reading of said control signal; and reproducing and outputting one of said analog video signal and said digital video signal in accordance with said priority indicated by said control signal.

8. A method according to claim 7, wherein said control signal is included in a blanking period of a vertical sync signal in said analog video signal.

9. A method according to claim 7, wherein said control signal is included as a subcode signal of said digital video signal.

* * * * *